(12) United States Patent
Aoki

(10) Patent No.: US 8,199,364 B2
(45) Date of Patent: Jun. 12, 2012

(54) IMAGE PROCESSING APPARATUS, AND IMAGE FORMING APPARATUS

(75) Inventor: Takayuki Aoki, Osaka (JP)

(73) Assignee: Kyocera Mita Corporation (JP)

( * ) Notice: Subject to any disclaimer, the term of this patent is extended or adjusted under 35 U.S.C. 154(b) by 690 days.

(21) Appl. No.: 12/108,140

(22) Filed: Apr. 23, 2008

(65) Prior Publication Data

US 2008/0278763 A1   Nov. 13, 2008

(30) Foreign Application Priority Data

May 9, 2007   (JP) ................................. 2007-124949

(51) Int. Cl.
*H04N 1/405* (2006.01)
*G06T 17/00* (2006.01)
*G09G 5/26* (2006.01)

(52) U.S. Cl. .................... 358/3.06; 345/467; 345/472.3; 382/200

(58) Field of Classification Search .................. 345/581, 345/467, 472.3; 382/200; 583/3.24; 358/3.06
See application file for complete search history.

(56) References Cited

U.S. PATENT DOCUMENTS

| 6,950,210 B2* | 9/2005 | Guo et al. ..................... 358/3.24 |
| 7,339,588 B2* | 3/2008 | Iwata et al. ................... 345/467 |
| 2005/0007634 A1 | 1/2005 | Nagao |
| 2007/0002054 A1* | 1/2007 | Bronstein ..................... 345/467 |
| 2007/0002065 A1* | 1/2007 | Otake et al. .................. 345/581 |
| 2010/0092092 A1* | 4/2010 | Sakaue ........................ 382/200 |

FOREIGN PATENT DOCUMENTS

JP   2004-306555   11/2004

\* cited by examiner

*Primary Examiner* — Charlotte M Baker
*Assistant Examiner* — Justin Katzwhite
(74) *Attorney, Agent, or Firm* — Gerald E. Hespos; Michael J. Porco

(57) ABSTRACT

When a second detector determines that a character image has a halftone (YES in #1) and a third detector (48) determines that a font size of the character image is equal to or greater than a threshold value $\beta$ and equal to or smaller than a threshold value $\alpha$ (YES in step #4), a fourth detector determines whether a presently focused pixel constitutes a particular portion of a character (step #5). When the fourth detector determines that the pixel data of the presently focused pixel constitutes the particular portion of the character (YES in step #5), the image processing section sets the pixel data to be subjected to a second screen processing which is performed at a higher gradation level (step #6).

8 Claims, 4 Drawing Sheets

IMAGE PROCESSING APPARATUS, AND IMAGE FORMING APPARATUS

BACKGROUND OF THE INVENTION

1. Field of the Invention

The present invention relates to an image processing apparatus and an image forming apparatus, and more particularly to a technology of executing a gradation processing to character data.

2. Description of the Related Art

In an image forming apparatus in which an image is formed on a recording sheet by an electrophotographic process using image bearing members such as a photoconductive drum and a transferring belt, when a character having a relatively small size (font size) is printed to have a halftone, an edge portion (end portion) and an isolated portion (such as a point in one character, and the like) may not be depicted and the character cannot be discriminated, so that it becomes difficult for a user to read the character.

In view of the above-described problem, a patent document (Japanese Patent Unexamined Publication No. 2004-306555) discloses the following technology. Firstly, it is determined whether the character size is equal to or smaller than predetermined points. When the character size is greater than the predetermined points, it is determined that the character size is greater than a normal size and then a screen processing for a normal size is executed to data constituting the character. On the other hand, when the character size is equal to or smaller than the predetermined points, it is determined that the character size is smaller than the normal size and then a screen processing for a small size, which makes a gradation of a character be greater than that achieved by the screen processing for a normal size, is executed to data constituting the character. In other words, the patent document discloses a technology of executing an image processing in accordance with the screen processing for a small size or the screen processing for a normal size to a whole character.

However, according to the technology disclosed in the patent document, the screen processing for a small size or the screen processing for a normal size is executed to a whole character, so that it is likely that a character which does not maintain a user's desirable gradation level is to be printed. Further, the screen processing for a small size is not applied to a character having a font size greater than the predetermined points, so that it may cause a situation where an edge portion (end portion) and an isolated portion are not to be depicted, depending upon a font size of a character.

SUMMARY OF THE INVENTION

The present invention was made to solve the above-described problems, and its object is to neatly print each of characters having a wide variety of font sizes while maintaining a user's desirable gradation and a halftone characteristic and not impairing a characteristic of each character.

In summary, an image processing apparatus in accordance with an aspect of the present invention includes: a data acquiring section for acquiring data to be printed; a character data detector for detecting whether the data acquired by the data acquiring section is character data; a halftone detector for detecting whether a character to be formed by the character data detected by the character data detector has a halftone; a font size determining section for detecting whether a font size of the character detected to have a halftone which is equal to or smaller than a first threshold value and equal to or greater than a second threshold value which is smaller than the first threshold value; a particular component data determining section for determining whether the character data of the character determined to be equal to or smaller than the first threshold value and equal to or greater than the second threshold value is a particular component data about a predetermined particular portion of the character; and an image processing section for executing a gradation processing to the character data in such a way that the particular component data is processed at a second gradation which is higher than a first gradation for processing a character data about a character having a font size greater than the first threshold, and the other component data is processed at the first gradation for processing a character data about a character having a font size greater than the first threshold.

These and other objects, features and advantages of the present invention will become more apparent upon reading of the following detailed description along with the accompanied drawings.

DETAILED DESCRIPTION OF THE PREFERRED EMBODIMENTS

Figure 1:
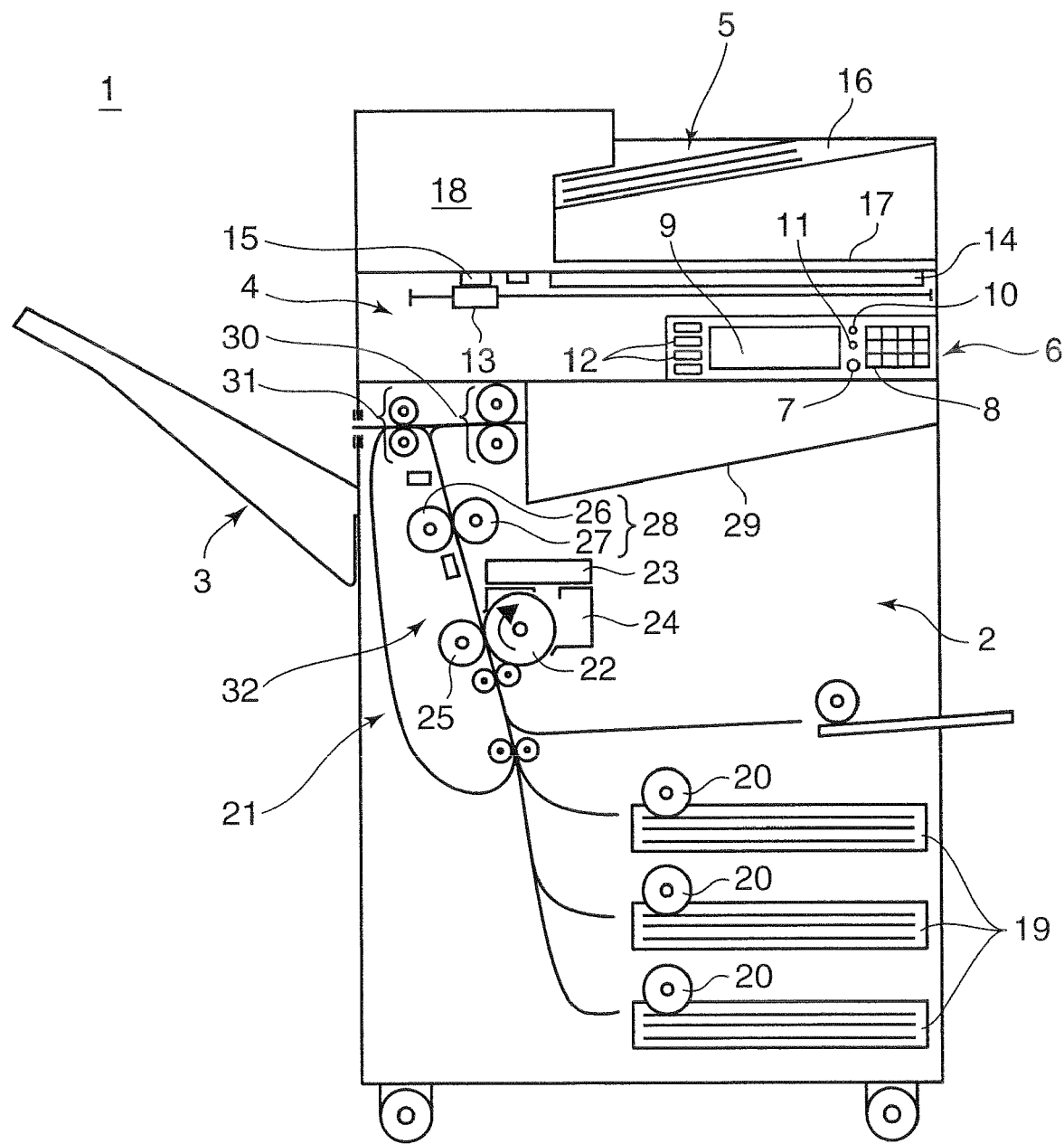
FIG. 1 is a side view schematically showing an internal configuration of a complex machine which is an example of an image forming apparatus in accordance with the present invention.

Hereinafter, an image processing apparatus and an image forming apparatus in accordance with an embodiment of the present invention will be described with reference to the drawings. FIG. 1 is a side view showing an internal configuration of a complex machine. A complex machine 1 has functions such as a copying function, a printer function, a scanner function, and a facsimile function, and includes a main body 2, a stack tray 3 provided on a left side of the main body 2, a document reading section 4 provided in an upper portion of the main body 2, and a document feeding section 5 provided on top of the document reading section 4.

Further, on a front portion of complex machine 1, there is provided an operating section 6. The operating section 6 includes a start key 7 for allowing a user to input a printing instruction, numerical keys 8 for inputting the number of copies and the like, a display section 9 including a liquid crystal display which displays operation guide information of various copying operations and has a touch panel function for input of the various settings, a reset key 10 for resetting contents of settings set through the display portion 9, a stop key 11 for stopping a printing (image forming) operation under execution, and a function switching key 12 for switching the functions between the copying function, the printer function, the scanner function, and the facsimile function.

The document reading section 4 includes a scanner section 13 having a CCD (Charge Coupled Device) sensor and an exposure lamp, and a document holder 14 and document reading slit 15 both made of a transparent member such as glass. The scanner section 13 is so configured as to be movable by an unillustrated driving section. When reading a document placed on the document holder 14, the scanner section 13 is moved along a document surface while being so positioned as to face the document holder 14, and outputs image data which is acquired by scanning a document image to a controller 35 (refer to FIG. 2). Further, when reading a document fed by the document feeding section 5, the scanner section 13 is moved to a position facing the document reading slit 15 to acquire an image of the document through the document reading slit 15 in synchronization with an operation of conveying a document performed by the document feeding section 5, and then outputs image data of the acquired image to the controller 35.

The document feeding section 5 includes a document holding portion 16 for holding a document, a document discharging portion 17 for discharging a document whose image is read, and a document conveying mechanism 18 having sheet-feeding rollers and conveying rollers (not illustrated) for taking out and conveying a document placed on a document holding portion 16 one after another to the position facing the document reading slit 15 and discharging the same to the document discharging portion 17.

Further, the document feeding section 5 is so provided as to be rotatable with respect to the main body 2 so that its upper surface side is movable upward. Opening an upper surface of the document holder 14 by moving the upper surface side of the document feeding section 5 upward enables an operator to place a document to be read, e.g. an opened book, onto an upper surface of the document holder 14.

The main body 2 includes a plurality of sheet feeding cassettes 19, sheet-feeding rollers 20 for taking out sheets one after another from the sheet feeding cassette 19 and conveying the same to the image forming section 21, and an image forming section 21 for forming an image onto a sheet conveyed from the sheet feeding cassette 19.

The image forming section 21 includes an optical unit 23 for forming an electrostatic latent image on a photoconductive drum 22 by outputting a laser light and the like based on image data acquired by the scanner section 13 to the photoconductive drum 22 for exposure, a developing section 24 for forming a toner image by allowing toners to be attached to the surface of the photoconductive drum 22 on which the electrostatic latent image is formed, and a transferring section 25 for transferring the toner image from the photoconductive drum 22 to the sheet, and a fixing device 28 having a pair of rollers 26, 27 for heating the sheet onto which the toner image is transferred to fix the toner image to the sheet, and a pair of conveying rollers 30, 31 provided on a sheet conveying passage in the image forming section 21 for conveying the sheet to the stack tray 3 or the sheet-discharging tray 29. The position at which the toner image formed on the surface of the photoconductive drum 22 is transferred to the sheet is named as a transfer position.

Further, when images are formed on both sides of the sheet, an image is formed on one side of the sheet by the image forming section 21, and thereafter the sheet is held in a state of being nipped by the pair of conveying rollers 30 on a side of the sheet-discharging tray 29. The pair of conveying rollers 30 are reversely rotated in this state so as to switch back the sheet. The sheet is sent to the sheet conveying passage 32 and conveyed again to a upstream area from the image forming section 21, and an image is formed on the other side by the image forming section 21. After that, the sheet is discharged to the stack tray 3 or the sheet-discharging tray 29.

Figure 2:
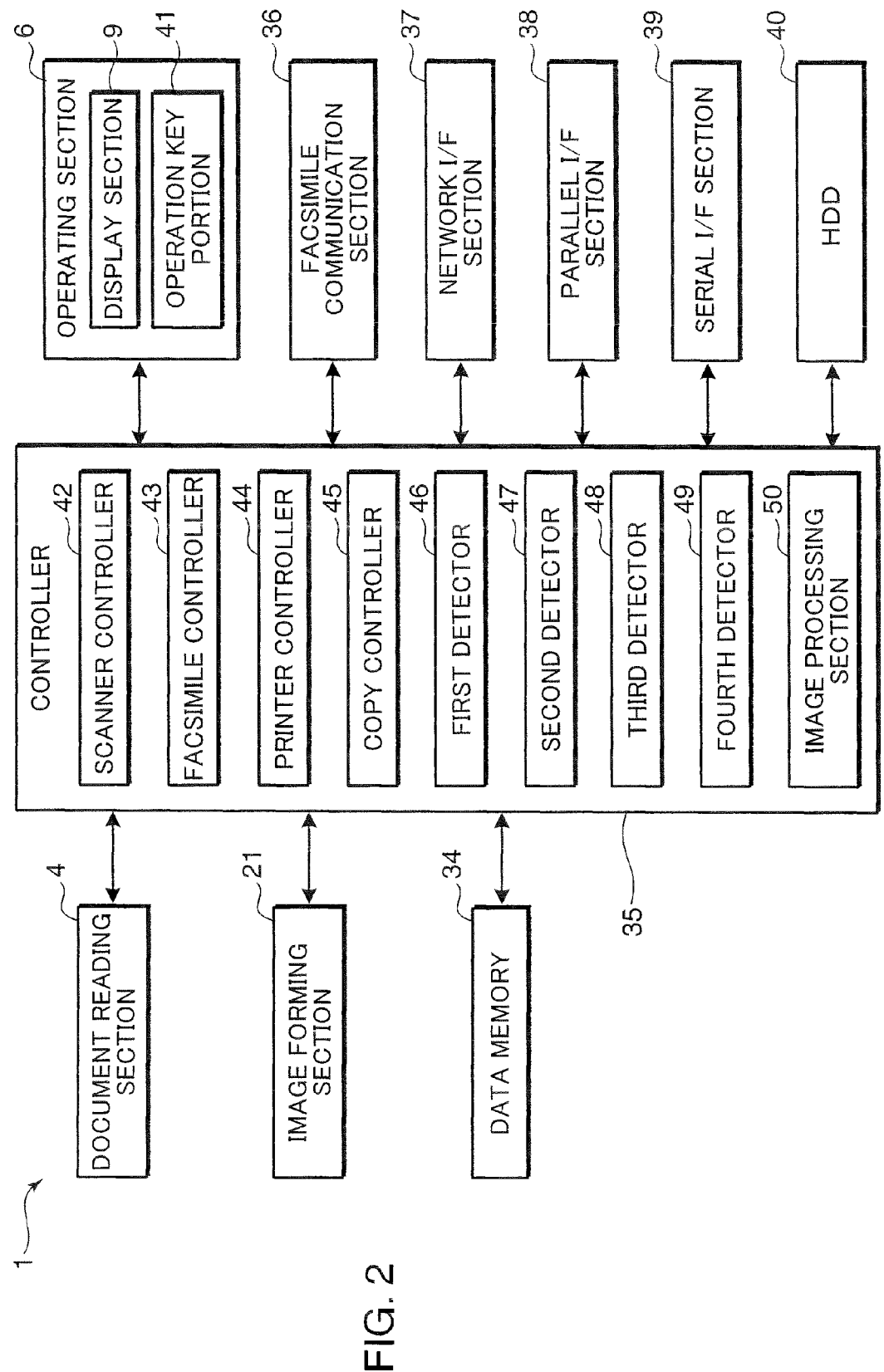
FIG. 2 is a block diagram showing an electrical configuration of the complex machine.

FIG. 2 is a block diagram showing an electrical configuration of the complex machine 1. As shown in FIG. 2, the complex machine 1 includes a document reading section 4, an image forming section 21, a data memory 34, a controller 35, an operating section 6, a facsimile communication section 36, a network I/F section 37, a parallel I/F section 38, a serial I/F section 39, and an HDD (Hard Disk Drive) 40.

The document reading section 4, the data memory 34, the controller 35, the operating section 6, and the network I/F section 37 realize a network scanner function of transmitting acquired image data to a designated IP address. Further, the document reading section 4, the image forming section 21, the data memory 34, the controller 35, the operating section 6, and the facsimile communication section 36 realize a facsimile function. Furthermore, the image forming section 21, the controller 35, the operating section 6, the network I/F section 37, and the parallel I/F section 38 realize a printer function. Furthermore, the document reading section 4, the image forming section 21, the controller 35, and the operating section 6 realize a copying function.

The operating section 6 corresponds to the operating section 6 shown in FIG. 1. The operating section 6 is used for allowing a user to perform input operations related to a copying function, a printer function, a facsimile function, a scanner function, and the like, and is adapted to give an operation order (command) and the like from the user to the controller 35. The operating section 6 includes a display section 9 having a touch panel and the like, and an operation key portion 41 having the above-described start key 7 and numerical keys 8. The operation key portion 41 is adapted for allowing a user to perform input of various instructions such as a copying execution start instruction or a facsimile transmission start instruction, and allowing the user to perform input settings of contents related to resume operation (start-up operation) of the fixing device 28 from a sleep mode (print-waiting time), as will be described below.

The document reading section 4 corresponds to the document reading section 4 shown in FIG. 1, and is adapted to acquire an image of a document optically to generate image data.

The image forming section 21 corresponds to the above-described image forming section 21, and is adapted to print on a predetermined sheet an image of image data, such as image data of a document read by the document reading section 4, image data received from an external personal computer or the like through the network I/F section 37, and facsimile data received from an external facsimile machine by the facsimile communication section 36.

The data memory 34 is a storage device adapted to store names of receivers and facsimile numbers of a short-cut button registration for use in a facsimile communication, and stores IP addresses of receivers for use at a time of being used as a network scanner.

The controller 35 is provided in an unillustrated CPU (Central Processing Unit) with peripheral devices such as a RAM (Random Access Memory) and a ROM (Read Only Memory) for storing a program which defines an operation of the CPU, and a storage section such as a RAM for temporarily storing data. Accordingly, the controller 35 performs an overall control of the complex machine 1 in response to instruction information received by the operating section 6 and detection signals from sensors provided at portions of the complex machine 1. More particularly, the controller 35 serves as a scanner controller 42, a facsimile controller 43, a printer controller 44, and a copy controller 45.

The program which is read by a computer as the controller 35 to realize the above-described functions may be stored in a nonvolatile and large-capacity external storage device such as an HDD 40 and transferred to a main storage device such as the RAM as needed, so that it can be executed by the CPU. The program may be supplied through recording mediums such as a ROM and a CD-ROM, or it may be supplied through a transmission medium such as a network connected to the network I/F section 37. The transmission medium is not limited to a wired transmission medium, and it may be a wireless transmission medium. Further, the transmission medium includes not only a communication line but also a relay device for relaying communication lines, for example, a communication link such as a router.

In a case where the program is supplied through the ROM, a ROM storing the program is mounted to the controller 35, so that the program can be executed by the CPU. In a case where the program is supplied through a CD-ROM, a reading device for reading the CD-ROM is connected to, for example, the parallel I/F section 38 and the program is transferred to the RAM or the HDD 40, so that the program can be executed by the CPU. Further, in a case where the program is supplied through a transmission medium, the program received through the network I/F section 37 is transferred to the RAM or the HDD 40, so that the program can be executed by the CPU.

The scanner controller 42 is adapted to control operations of sections used for realizing a scanner function. The facsimile controller 43 is adapted to control operations of sections used for realizing a facsimile function. The printer controller 44 is adapted to control operations of sections used for realizing a printer function. The copy controller 45 is adapted to control operations of sections used for realizing a copying function.

The facsimile communication section 36 includes an encoding/decoding section (not illustrated), a modem (not illustrated), and an NCU (Network Control Unit: not illustrated), and is adapted to transmit image data of a document read by the document reading section 4 to another facsimile machine through a phone line and an internet line and receive image data transmitted from another facsimile machine. The encoding/decoding section compresses and encodes image data to be transmitted and expands and decodes received image data. The modem is adapted to modulate compressed and encoded image data into audio signals and demodulate received signals (audio signals) into image data. Further, the NCU is adapted to control a connection to an addressee facsimile machine through a phone line.

The network I/F section 37 is adapted to control transmission of various data with a user-side server connected via a network by using a network interface (for example, 10/100base-TX). Further, in a case where one or a plurality of terminal devices such as personal computers are connected to a network, the network I/F section 37 controls transmission of various data between the terminal devices. For example, the network I/F section 37 transmits document image data read by the document reading section 4 to the terminal device, and receives image data transmitted from the terminal devices for printing performed by the image forming section 21.

The parallel I/F section 38 is adapted to receive print data from an external equipment or the like by using a high-speed bi-directional parallel interface (for example, IEEE1284 compatible) to perform a parallel transfer of transmitting data by plural bits with a plurality of signal lines. The serial I/F section 39 is adapted to receive various data from an external equipment by using a serial interface (for example, RS-232C) to perform a serial transfer of transmitting data one bit after another sequentially through a single signal line.

The HDD 40 is adapted to store image data read by the document reading section 4, image data transmitted through the network, and output formats and the like set in the image data. The image data stored in the HDD 40 is used not only for the complex machine 1 but also for the terminal device, such as confirmation by the terminal devices through the network I/F section 37 and transfer to a predetermined folder in the terminal device.

In the complex machine 1, various functions are realized by combining the above-described functions. For example, the PC transmission function, the Email transmission function, the facsimile transmission function, and the like may be realized as the scanner function. Here, the PC transmission function is a function of directly transmitting image data read from a document to any terminal device through the network. The Email transmission function is a function of directly transmitting image data read from a document to, for example, an unillustrated SMTP server through the network as an attached file of an electronic mail and further transmitting the electronic mail from the SMTP server to an external device and the like through the network to thereby transmit image data read from a document as an attached file of an electronic mail. The facsimile transmission function is a function of directly transmitting image data read from a document to any facsimile machine and the like through a phone line and the like.

In addition to the above-described configuration, the controller 35 includes first through fourth detectors 46 through 49 and an image processing section 50.

Figure 4:
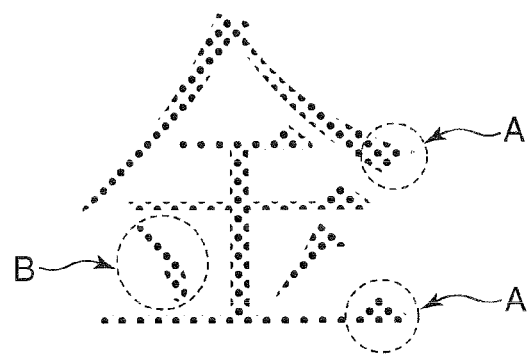
FIG. 4 shows problems of a conventional technology.
Figure 5A:
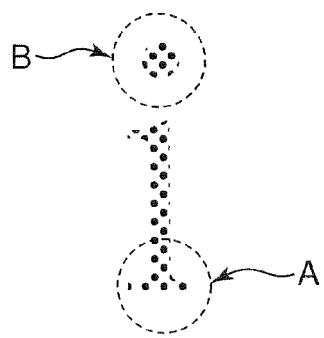
FIG. 5 shows end portions and isolated portions of characters.
Figure 5B:
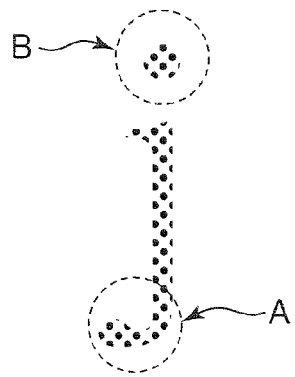

The first detector (character data detector) 46 performs an edge detection in accordance with a known edge detection method with respect to data of a document image read by the document reading section 4, or image data received from other facsimile machine and a personal computer (hereinafter, referred to as an external equipment). Further, the first detector 46 detects whether a character exists in data of a document image read by the document reading section 4 or image data received from the external equipment in accordance with a known method based on the edge detection. The edge detection enables detection of a portion positioned at an end portion of a character, for example, as indicated by arrows A of FIG. 4 and arrows A of FIGS. 5A and 5B.

The second detector (halftone detector) 47 detects whether an image included in acquired image data is a halftone image in accordance with the known detection method when the image data is acquired by the document reading section 4. When image data is received from the external equipment, the second detector 47 detects whether an image configured by the image data is a halftone image in accordance with a known detection method or, for example, a detection method which will be described herebelow.

The image data received from an external equipment has pixel data and attribute data for each pixel. The pixel data is data (substantive data) constituting the image. The attribute data includes data indicating whether an image configured by the pixels is a character, the font data indicating a font size of a character in a case where the image configured by the pixels is a character, data indicating whether the character has a halftone in the case where the image configured by the pixels is a character, and particular component data indicating whether the pixels constitute a particular portion (for example, an end portion, an isolated portion, or an edge portion of the character). In a case where image data is received from an external equipment, the second detector 47 detects whether the character has a halftone based on attribute data included in the image data.

The third detector (font size determining section) 48 detects a font size of a character in a known method when the character is detected by the first detector 46. When image data is received from the external equipment, the third detector 48 detects a font size from attribute data included in the image data.

The fourth detector (particular component data determining section) 49 detects an end portion, an isolated portion, or an edge portion of a character by the edge detection when the document image read by the document reading section 4 includes a character. Further, when image data is received from the external equipment, the fourth detector 49 detects the end portion, the isolated portion, or the edge portion from particular component data included in attribute data of the image data. The isolated portion of a character is a portion which is not connected to the other part of a character as indicated by, for example, arrows B of FIG. 4 and arrows B of FIGS. 5A, 5B.

The image processing section 50 is adapted to execute various image processing with respect to image data. For example, the image processing section 50 executes various image processing such as predetermined correction processing e.g., a level correction and a gamma correction, compression or expansion processing of image data, and enlargement or reduction processing, with respect to image data acquired by a reading operation performed by the document reading section 4. The image processing section 50 includes an unillustrated image memory, so that the processed image data and the like are stored in the image memory and outputted to the image forming section 21, the facsimile communication section 36, or the network I/F section 37.

Further, the image processing section 50 is adapted to perform a screen processing (gradation processing) with respect to image data. The screen processing is a processing of determining a size of halftone-dots, a pattern of halftone-dots, and an output time of a laser light emitted from the optical unit 23, and setting a pulse width of pulse signals outputted to the optical unit 23 when colors and gradation of a picture portion is expressed with use of halftone dots (screen).

Especially in the present embodiment, the image processing section 50 executes the following processing in accordance with a font size of a character. In other words, threshold values α, β (α>β) about font sizes of a character are set in advance. In a case where a character has a font size which is greater than the threshold value α, the image processing section 50 executes a normal screen processing at a predetermined gradation (hereinafter, referred to as a first screen processing) to a whole character. When the character has a font size which is equal to or greater than the threshold value β and equal to or smaller than the threshold value α, the image processing section 50 executes a second screen processing of making a gradation higher (for example, increasing the number of halftone-dots) than that of the first screen processing only to an end portion and isolated portion of the character. When the character has a font size which is smaller than the threshold value β, the image processing section 50 executes a third screen processing of making the gradation be higher (for example, increasing the number of halftone dots) than that of the first screen processing character with respect to the whole character.

Figure 3:
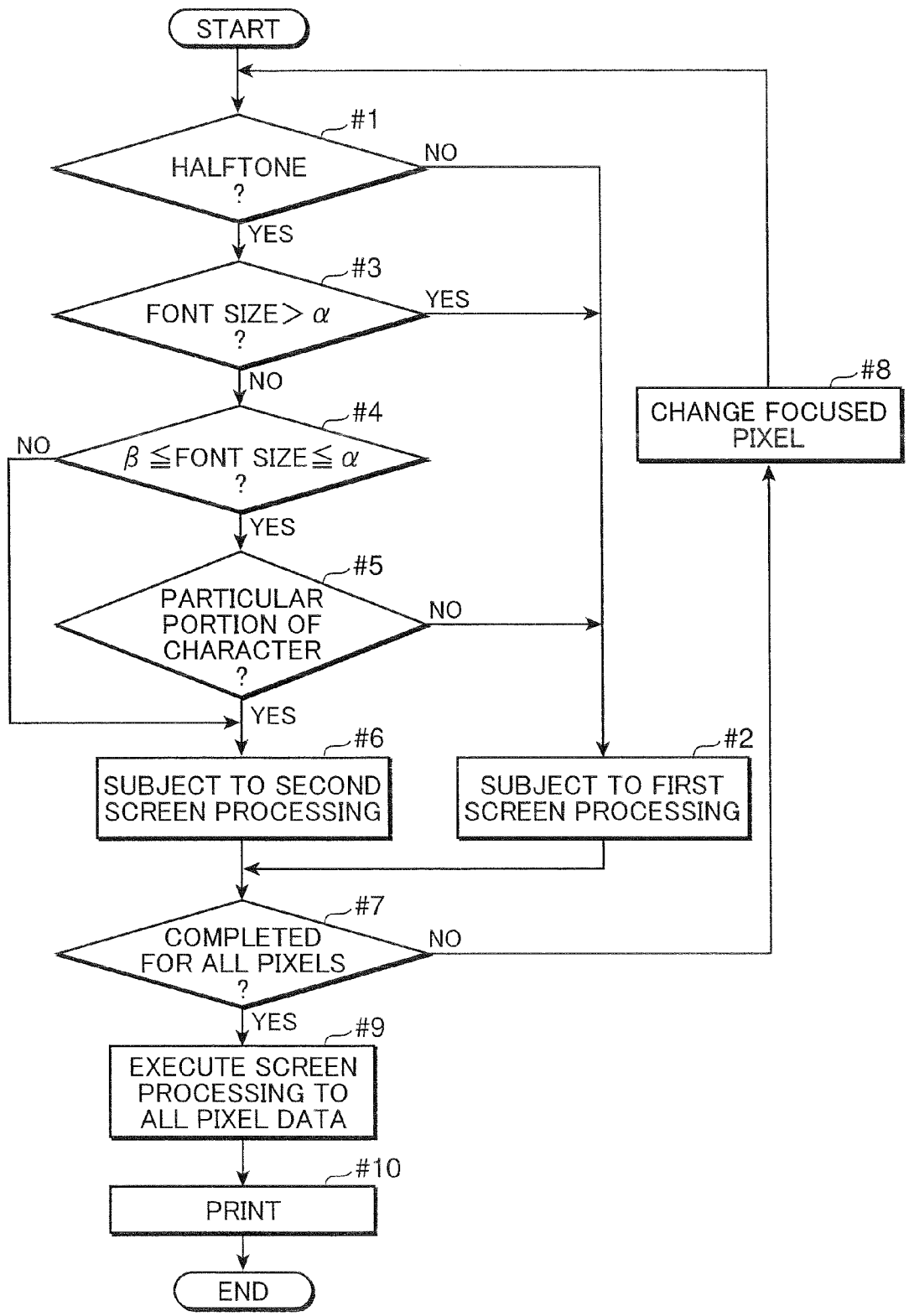
FIG. 3 is a flowchart showing an image forming processing executed by the controller.

FIG. 3 is a flowchart showing an image forming processing executed by the controller 35. In the following description, the image forming processing is executed with respect to character data which is detected by the detection of whether character data is included in the acquired image data in the method described above.

As shown in FIG. 3, the second detector 47 focuses on pixel data of a certain pixel in the acquired image data, and determines whether a character image (hereinafter, referred to as character) including the pixel data is a halftone image (step #1). When it is determined by the second detector 47 that the character is not a halftone image (NO in step #1), the image processing section 50 sets the pixel data to be subjected to the first screen processing (normal screen processing) (step #2).

When the second detector 47 determines that the character is a halftone image (YES in step #1), the third detector 48 detects a font size of the character and further determines whether the detected font size is greater than the threshold value α (step #3). When the third detector 48 determines that the font size of the character is greater than the threshold value α (YES in step #3), the image processing section 50 sets the pixel data to be subjected to the first screen processing (normal screen processing) (step #2).

When the third detector 48 determines that the font size is not greater than the threshold value α (NO in step #3), the third detector 48 further determines whether the font size is equal to or greater than the threshold value β and equal to or smaller than the threshold value α (step #4). When the third detector 48 determines that the font size is equal to or greater than the threshold value β and equal to or smaller than the threshold value α (YES in step #4), the fourth detector 49 determines whether a presently focused pixel constitutes a particular portion (the end portion, the isolated portion, or the edge portion, which are described above) of a character (step #5). When the fourth detector 49 determines that pixel data of the presently focused pixel does not constitute the particular portion (NO in step #5), the image processing section 50 sets the pixel to be subjected the first screen processing (normal screen processing) (step #2).

On the other hand, when the fourth detector 49 detects that pixel data of the presently focused pixel constitutes the particular portion of the character (YES in step #5), the image processing section 50 sets the pixel data to be subjected to the second screen processing (step #6).

Further, when the third detector 48 determines that a font size of the character is smaller than the threshold value β (NO in step #4), the step #5 is skipped, and the image processing section 50 executes the processing of step #6.

Then, the controller 35 determines whether the processing of steps #1 through #6 are executed for all of pixels (step #7). If the processing are not completed for all of the pixels (NO in step #7), a focused pixel is changed (step #8). When the processing of steps #1 through #6 are completed for the focused pixel which is changed, and the controller 35 determines that the processing of #1 through #6 are completed for all of the pixels (YES in step #7), the image processing section 50 executes the first screen processing with respect to image data of pixels set to be subjected to the first screen processing, and executes the second screen processing with respect to image data of pixels set to be subjected to the second screen processing (step #9). After that, the controller 35 controls the image forming section 21 to perform printing of processed image data to a sheet (step #10).

As described above, in the case where a character has a font size which is equal to or greater than the threshold value β and equal to or smaller than the threshold value α, the image processing section 50 executes the second processing of making gradation to be higher than that of the first screen processing only to an end portion, an isolated portion, or an edge portion of the character. Accordingly, particular portions such as the end portion, the isolated portion, and the like of the character indicated by, for example, the arrows A and B of FIG. 4 and the arrows A and B of FIGS. 5A and 5B can be printed clearly (neatly).

Further, since a subject of the second screen processing is limited to the particular portions such as the end portion, the isolated portion, and the like of a character, the character components other than the particular portion are maintained to have a user's desirable gradation which is set at a time of printing the character with the font size, and reproductivity of color can be secured in the case of printing character having a desirable color by superimposing toners of a plurality of colors. In other words, in the case of printing a character having a desirable color by superimposing toners of a plurality of colors, a color generated at a time of superimposing toner so of different colors differs from a desirable color if gradation differs in the colors. However, in the processing according to the present embodiment, a subject of the second screen processing is limited to particular portions such as end portion and isolated portion of a character in the case where the character font size is equal to or greater than the threshold value β and equal to or smaller than the threshold value α. Accordingly, total gradation of each color is set to be a desirable gradation, so that difference in color of a character generated in the case of superimposing toners of a plurality of colors and the user's desirable color can be prevented or suppressed. Accordingly, a high-quality printing can be performed.

In summary, an image processing apparatus in accordance with an aspect of the present invention includes: a data acquiring section for acquiring data to be printed; a character data detector for detecting whether the data acquired by the data acquiring section is character data; a halftone detector for detecting whether a character to be formed by the character data detected by the character data detector has a halftone; a font size determining section for detecting whether a font size of the character detected to have a halftone which is equal to or smaller than a first threshold value and equal to or greater than a second threshold value which is smaller than the first threshold value; a particular component data determining section for determining whether the character data of the character determined to be equal to or smaller than the first threshold value and equal to or greater than the second threshold value is a particular component data about a predetermined particular portion of the character; and an image processing section for executing a gradation processing to the character data in such a way that the particular component data is processed at a second gradation which is higher than a first gradation for processing a character data about a character having a font size greater than the first threshold, and the other component data is processed at the first gradation for processing a character data about a character having a font size greater than the first threshold.

According to the aspect of the invention, when a font size of a character is equal to or smaller than the first threshold value and equal to or greater than the second threshold value, gradation of only character data presenting a predetermined particular component of the character is made higher relative to the case where the font size of the characters greater than the first threshold value. Accordingly, the particular portion can be printed clearly while gradation of the whole character is substantially maintained. In other words, according to the invention, characters having a wide range of font sizes can be neatly printed without losing a characteristic of the character while a user's desirable gradation and halftone characteristic are maintained.

Further, according to the aspect of the present invention, the image processing section executes the gradation processing to whole character data about the character determined to be smaller than the second threshold value at the second gradation.

According to the aspect of the invention, when the font size is smaller than the second threshold value, whole character data about a character is processed at a second gradation which is higher than a first gradation for processing a character data about a character having a size greater than the first threshold value. Accordingly, even a relatively small character can be printed clearly.

Further, according to the aspect of the present invention, the particular portion includes at least one of an end portion, an isolated portion, and an edge portion of a character.

According to the aspect of the invention, a character can be printed clearly without omitting an end portion, an isolated portion, and an edge portion of the character.

Further, according to the aspect of the present invention, the character data detector determines whether the data acquired by the data acquiring section is character data by executing an edge detection processing.

Further, according to the aspect of the present invention, the data acquired by the data acquiring section has attribute data for each pixel, and the attribute data includes information indicating whether an image constituted by data including the pixel is a character, and the character data detector detects whether the data acquired by the data acquiring section is character data based on the attribute data.

According to the aspects of the invention, it can be assuredly detected whether the acquired data is character data.

Further, according to the aspect of the present invention, the data acquired by the data acquiring section has attribute data for each pixel, and the attribute data includes information indicating whether an image constituted by data including the pixel is a character and font size information of the character in the case where the image is a character, and the character data detector detects whether the data acquired by the data acquiring section is character data based on the attribute data, and the font size determining section determines whether a font size of the character is equal to or smaller than the first threshold value and equal to or greater than the second threshold value.

According to this aspect of the invention, it can be assuredly detected whether the acquired data is character data and whether the font size of the character is equal to or smaller than the first threshold value and equal to or greater than the second threshold value.

Further, according to the aspect of the present invention, the data acquired by the data acquiring section has attribute data for each pixel, and the attribute data includes information indicating whether an image constituted by data including the pixel is a character, font information of the character in the case where the image is a character, and information indicating whether the character has a halftone in the case where the image is a character, and the character data detector detects whether the data acquired by the data acquiring section is character data based on the attribute data, and the font size determining section determines whether a font size of the character is equal to or smaller than the first threshold value and equal to or greater than the second threshold value, and the halftone determining section detects whether the character has a halftone.

According to the aspect of the present invention, it can be assuredly detected whether the acquired data is character data and, whether the font size of the character is equal to or smaller than the first threshold value and equal to or greater than the second threshold value, and whether the character has a halftone.

Further, the present invention includes an image forming apparatus having: a data acquiring section for acquiring data to be printed; a character data detector for detecting whether the data acquired by the data acquiring section is character data; a halftone detector for detecting whether a character to be formed by the character data detected by the character data detector has a halftone; a font size determining section for detecting whether a font size of the character detected to have a halftone which is equal to or smaller than a first threshold value and equal to or greater than a second threshold value which is smaller than the first threshold value; a particular component data determining section for determining whether the character data of the character determined to be equal to or smaller than the first threshold value and equal to or greater than the second threshold value is a particular component data about a predetermined particular portion of the character; an image processing section for executing a gradation processing to the character data in such a way that the particular component data is processed at a second gradation which is higher than a first gradation for processing a character data about a character having a font size greater than the first threshold, and the other component data is processed at the first gradation for processing a character data about a character having a font size greater than the first threshold; and an image forming section for outputting an image of the character data processed by the image processing section to a sheet.

According to the aspect of the invention, characters of a wide range of font sizes can be printed neatly without losing a characteristic thereof while user's desirable gradation and halftone are maintained.

This application is based on Japanese Patent application serial No. 2007-124949 filed in Japan Patent Office on May 9, 2007, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image processing apparatus comprising:
a data acquiring section for acquiring data to be printed;
a character data detector for detecting whether the data acquired by the data acquiring section is character data;
a halftone detector for detecting whether a character to be formed by the character data detected by the character data detector has a halftone;
a font size determining section for detecting whether a font size of the character detected to have a halftone is in a specified range between a first threshold value and a second threshold value, where the second threshold value is smaller than the first threshold value;
a particular component data determining section for determining whether the character data of the character determined to be in the specified dimensional range is a particular component data including a predetermined particular portion that corresponds to an isolation portion of the character; and
an image processing section for executing a gradation processing to the character data that is determined to include the particular component data by the particular component data determining section in such a way that only the particular component data is processed at a gradation that is higher than a gradation for processing a character data for a character having a font size greater than the first threshold value, and a portion other than the particular component data is processed at a gradation initially set for character data, wherein said particular component data is processed at said gradation by increasing the number of halftone-dots.

2. The image processing apparatus according to claim 1, wherein the image processing section executes the gradation processing at a second gradation to whole character data if the character is determined to be smaller than the second threshold value.

3. The image processing apparatus of claim 1, wherein the particular component determining section further determines whether the character data of the character determined to be in the specified dimensional range is an end portion of a character.

4. The image processing apparatus according to claim 1, wherein the character data detector determines whether the data acquired by the data acquiring section is character data by executing an edge detection processing.

5. The image processing apparatus according to claim 1, wherein
the data acquired by the data acquiring section has attribute data for each pixel, and the attribute data includes information indicating whether an image constituted by data including the pixel is a character, and
the character data detector detects whether the data acquired by the data acquiring section is character data based on the attribute data.

6. The image processing apparatus according to claim 1, wherein
the data acquired by the data acquiring section has attribute data for each pixel, and the attribute data includes information indicating whether an image constituted by data including the pixel is a character and font size information of the character in the case where the image is a character, and
the character data detector detects whether the data acquired by the data acquiring section is character data based on the attribute data.

7. The image processing apparatus according to claim 1, wherein
the data acquired by the data acquiring section has attribute data for each pixel, and the attribute data includes information indicating whether an image constituted by data including the pixel is a character, font information of the character in the case where the image is a character, and information indicating whether the character has a halftone in the case where the image is a character.

8. An image forming apparatus comprising:
a data acquiring section for acquiring data to be printed;
a character data detector for detecting whether the data acquired by the data acquiring section is character data;
a halftone detector for detecting whether a character to be formed by the character data detected by the character data detector has a halftone;
a font size determining section for detecting whether a font size of the character detected to have a halftone is in a specified dimensional range between a first threshold value and a second threshold value, where the second threshold value is smaller than the first threshold value;
a particular component data determining section for determining whether the character data of the character determined to be in the specified dimensional range is a particular component data including a predetermined particular portion that corresponds to an isolated portion of the character;
an image processing section for executing a gradation processing to the character data that is determined to include the particular component data by the particular component data determining section in such a way that only the particular component data is processed at a gradation that is higher than a gradation for processing a character data for a character having a font size greater than the first threshold value, and a portion other than the particular component data is processed at a gradation initially set for the character data, wherein said particular component data is processed at said gradation by increasing the number of halftone-dots; and
an image forming section for outputting an image of the character data processed by the image processing section to a sheet.

* * * * *